United States Patent [19]

Savit

[11] Patent Number: 4,648,082
[45] Date of Patent: Mar. 3, 1987

[54] MARINE ACOUSTIC GRADIENT SENSOR

[75] Inventor: Carl H. Savit, Houston, Tex.

[73] Assignee: Western Geophysical Company of America, Houston, Tex.

[21] Appl. No.: 707,957

[22] Filed: Mar. 4, 1985

[51] Int. Cl.[4] .................. H04R 1/02; H04R 13/00; B01N 21/41

[52] U.S. Cl. .................. 367/149; 367/106; 367/151; 367/171; 367/174; 350/96.29; 73/657

[58] Field of Search .............. 73/653, 657, 705, 112; 350/96.23, 96.24, 96.29; 250/227; 367/20, 78, 79, 80, 128, 129, 130, 140, 141, 149, 151, 153, 154, 163, 166, 167, 169, 171, 172, 174; 181/110, 112

[56] References Cited

U.S. PATENT DOCUMENTS

| | | | |
|---|---|---|---|
| 3,831,137 | 8/1974 | Cuomo | 367/141 |
| 3,952,281 | 4/1976 | Parrack | 367/20 |
| 4,078,223 | 3/1978 | Strange | 367/58 |
| 4,115,753 | 9/1978 | Shajenko | 367/154 X |
| 4,162,397 | 7/1979 | Bucaro et al. | 367/149 X |
| 4,286,468 | 9/1981 | Altman | 73/655 |
| 4,313,192 | 1/1982 | Nelson et al. | 367/130 |
| 4,320,475 | 3/1982 | Leclerc et al. | 367/149 |
| 4,360,247 | 11/1982 | Beasley | 367/149 |
| 4,380,394 | 4/1983 | Stowe | 356/358 |
| 4,488,040 | 12/1984 | Rowe | 250/227 |
| 4,518,857 | 5/1985 | McMahon et al. | 367/149 X |
| 4,545,253 | 10/1985 | Avicola | 367/140 |
| 4,547,668 | 10/1985 | Tsikos | 250/227 |
| 4,547,869 | 10/1985 | Savit | 367/149 |
| 4,572,949 | 2/1986 | Bowers et al. | 73/657 X |
| 4,589,286 | 5/1986 | Berthold, III | 73/705 X |

FOREIGN PATENT DOCUMENTS 556194 8/1932 Fed. Rep. of Germany ...... 367/172

OTHER PUBLICATIONS

Spillman et al., Schlieran Multimode Fiber-Optic Hydrophone, Sperry Research, Mass., Apr. 1980, Applied Physics Letter, pp. 145–147.

Marciniak, Robert, Unidirectional Underwater-Sound Pressure-Gradient Transducer, IEEE Transactions on Sonics, vol. SV-18 #2, 1971, pp. 89–95.

Primary Examiner—Charles T. Jordan
Assistant Examiner—Brian S. Steinberger
Attorney, Agent, or Firm—Barry C. Kane; Robert E. Lowe

[57] ABSTRACT

A pressure gradient sensor is disclosed for optically sensing the direction and magnitude of an acoustic wave propagating through a fluid. Each sensor consists generally of at least three fiber-optic displacement sensors disposed within a circular array oriented perpendicular to the longitudinal axis of a streamer. Each sensor phase-modulates a coherent light signal indicative of the water pressure sensed outside the streamer. The output of the signals include a component due to transient pressure waves and a component due to hydrostatic pressure differences between the sensors.

5 Claims, 6 Drawing Figures

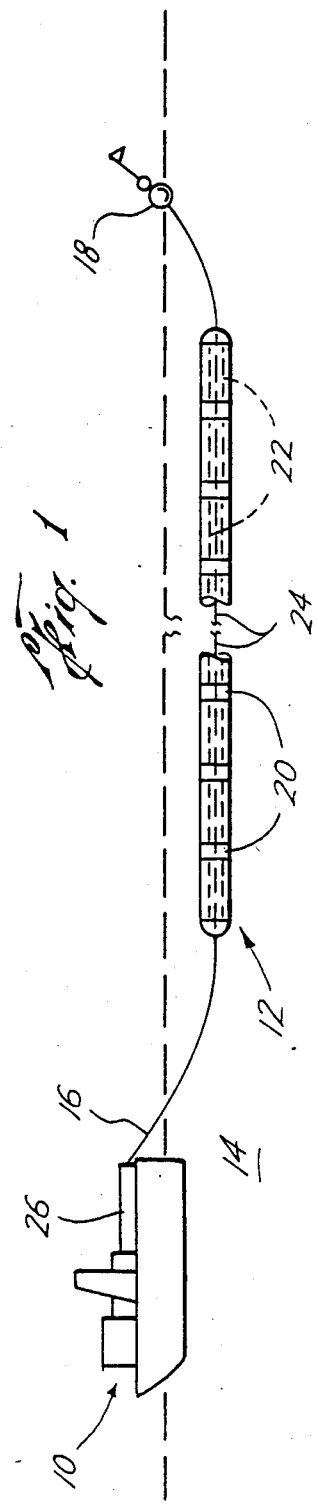
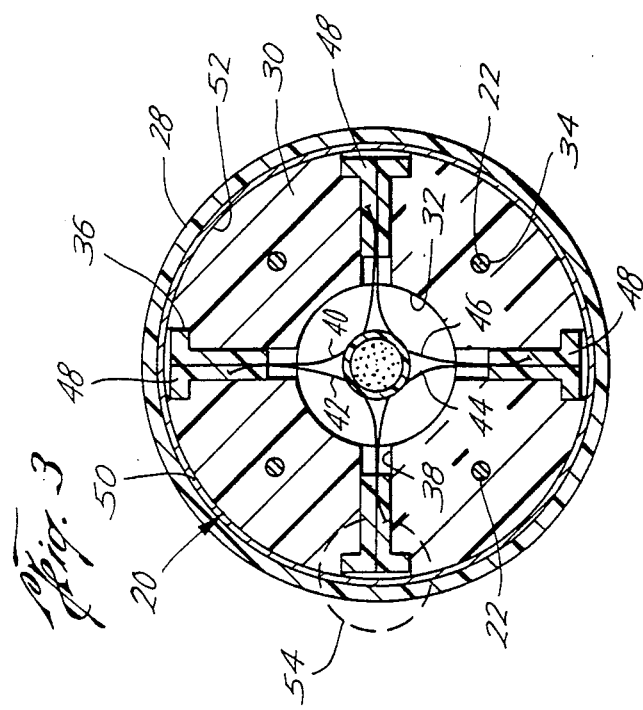
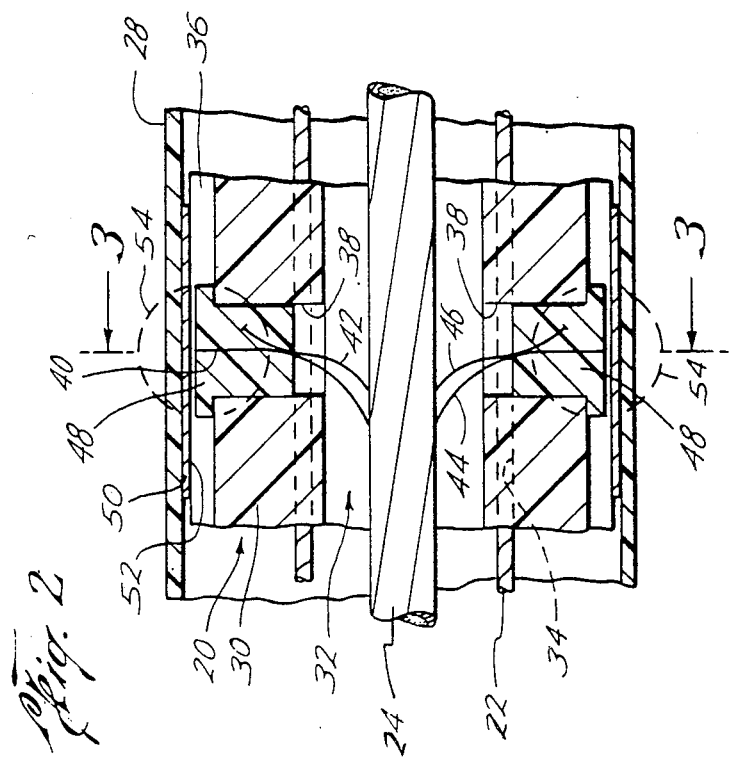

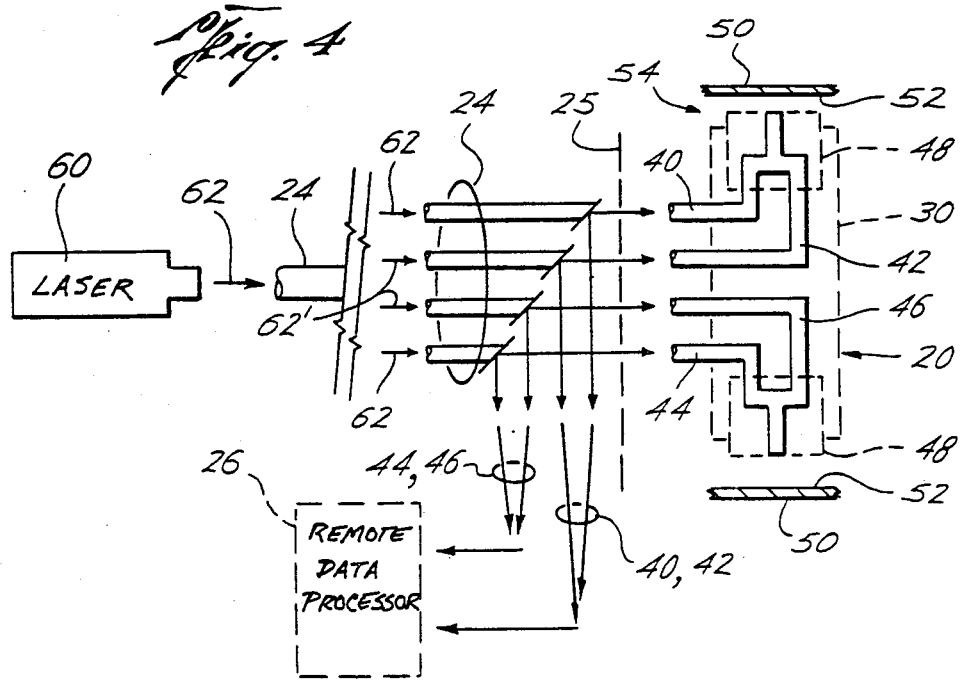
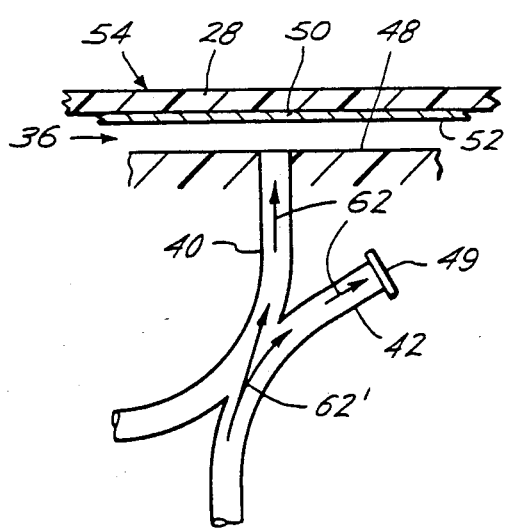 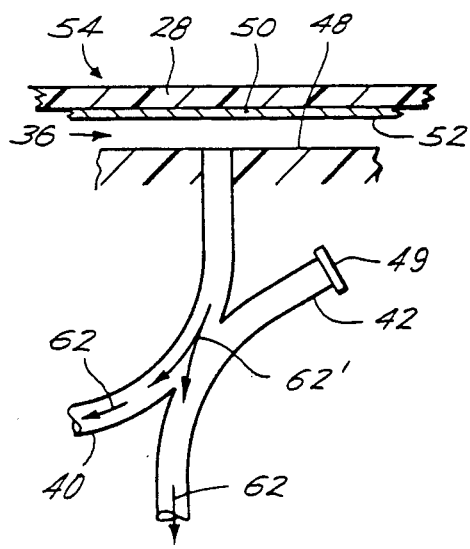

MARINE ACOUSTIC GRADIENT SENSOR

BACKGROUND OF THE INVENTION

1. Field of the Invention

This invention relates generally to fiber optic displacement sensors and particularly to a fiber optic gradient sensor for determining a direction and magnitude of an acoustic wave propagating through a fluid.

2. Discussion of the Prior Art

In marine seismic exploration, a plurality of pressure sensors are enclosed in a long tubular plastic streamer which may be several miles long and towed behind a ship. The earth layers beneath the ocean are insonofied by an acoustic source towed near the ship. The sonic waves generated by the acoustic source penetrate the earth and are reflected back to the ocean surface. The acoustic waves are detected by the sensors and are converted to electrical signals that are received and recorded by well known equipment aboard the ship.

The earth-reflected acoustic waves not only return directly to the sensors, but are reflected a second time at the ocean surface. The surface-reflected acoustic waves impinge upon the sensors a second time, delayed by a time proportional to twice the depth of the sensors. On the recording, the surface-reflected waves appear as secondary or "ghost" reflections of the earth's layers. Because the earth-reflected and surface-reflected waves arrive close together in time—a few milliseconds—they tend to interfere with each other, disturbing the first reflected signal.

Often, an object horizontally offset from the source, such as an offshore drilling rig or ship, reflects the acoustic signal back to the sensors at an angle other than vertical and interferes with the earth-reflected signals. It is therefore desirable to determine the propagation direction of the acoustic waves so that the earth-reflected signals may be distinguished from the surface-reflected and other secondary-reflected signals.

U.S. Pat. No. 3,952,281 issued to Parrack teaches a method of distinguishing earth-reflected signals from surface reflected and other secondary-reflected signals. Parrack's method employs two streamers towed behind a ship. One streamer is towed at a depth greater than the other streamer. When an earth-reflected signal passes both streamers, the uppermost streamer receives the signal by a time delay proportional to the vertical distance between the streamers. The delay time of the signal between the two streamers provides the vertical propagation direction. However, a major disadvantage to Parrack's method is the need for two streamers. Since each streamer may cost more than half a million dollars each, the two-streamer method tends to be cost-prohibitive. A second disadvantage stems from the fact that one streamer must be towed deeper than the other. This necessarily leads to slower towing speeds to prevent the deeper towed cable from strumming.

A two-cable system could be eliminated provided substantially compact sensors could be attained. If adequate sensors could be found, it would be possible to mount a substantially vertical array of conventional sensors within the same streamer. A major disadvantage to this system is that the streamer twists and turns as it is being towed behind the ship. Assuming that a vertical array of conventional sensors were mounted inside the streamer, the sensors would be incapable of determining which direction is up or down.

It is well-known that a pressure gradient exists between two vertical points in a column of fluid. If the pressure gradient could be measured between two vertically displaced sensors within the streamer, then the rotational position of the sensors could be determined and the surface-reflected waves could be distinguished from the earth-reflected waves.

Conventional marine pressure sensors are piezo-electric ceramic wafers. The wafers are generally mounted to operate in the bender mode. Transient pressure changes due to propagating acoustic/pressure waves, flex the piezo-electric wafers to generate an AC electrical charge. Piezo-electric wafers are also sensitive to static pressure changes. Piezo-electric wafers generate DC electrical charge when flexed in a single direction by changes in hydrostatic pressure. However, the DC current tends to leak off quickly through the associated circuitry. Therefore it is difficult to determine the hydrostatic pressure gradient surrounding the array.

A fiber-optic gradient sensor for use in a marine streamer is disclosed in U.S. Pat. No. 4,547,869 and is assigned to the assignee of this invention. The above cited gradient sensor consists of at least three optic-fiber coil pressure-sensors mounted at equiangular positions from each other and adjacent to the interior surface of the streamer housing. One end of each sensor coil is directionally coupled by a 3dB coupler to a common input fiber. The other end of the coil is directionally coupled in a similar manner to a common output fiber. Each sensor coil receives a coherent monochromatic pulse of light from a laser or LED through the input fiber. Transient and static pressures cause each coil to frequency modulate the light pulse passing therethrough. The modulated light pulse is then passed by the output fiber to a multiple input interferometer which then processes the data in a well known manner.

In the above system, the sensor coils must be placed adjacent the inner surface of the streamer skin to expose maximum coil area to the impinging pressure wave. This is necessary so as to apply transient and static pressure along the coil equally. This distribution is also necessary to obtain maximum distance between coils to provide a greater signal delay thereby to increase the sensitivity of the configuration for determining streamer orientation and acoustic wave propagation direction. The optic-fiber coils mounted adjacent to the inner surface of the streamer are susceptible to impact from sources outside the streamer which commonly damage the fibers.

It is an object of this invention to provide a substantially vertical planar array of sensors within a single streamer cable capable of detecting pressure gradients in a fluid.

It is another object of this invention to determine the orientation of a marine streamer rotating about its longitudinal axis so as to distinguish earth-reflected signals from surface reflected signals and from signals traveling substantially horizontally.

It is yet another object of this invention to determine direction and magnitude of acoustic waves propagating through a fluid utilizing phase modulated optical signals.

It is yet a further object of this invention to provide a more rugged gradient sensor less susceptible to damaging impacts.

SUMMARY OF THE INVENTION

The pressure-gradient sensor of this invention consists essentially of a set of three or more fiber-optic displacement sensors radially mounted within a cylindrical support. Each sensor radiates outward from the axis of the support with the distal ends proximate a reflector. Many such sets may be mounted at spaced intervals along and within a marine streamer. Each sensor set is connected to a recording unit and light source via a signal-transmission bundle running the length of the streamer.

A light source associated with the recording unit launches a coherent light pulse into the transmission bundle which distributes the light pulse to each sensor within a set. Each displacement sensor directs the light pulse onto the reflector where the pulse is reflected and re-enters the sensor. The counter-propagating pulses are passed down the transmission bundle to an interferometer in the recording unit where they are compared to a sample of the input pulse.

Transient and hydrostatic pressure changes occurring outside the streamer are detected at each sensor set. The pressure changes cause each reflector to vibrate near the end of each displacement sensor, changing the reflective distance. Movement of the reflector causes a phase shift in the reflected pulse. The phase modulated pulses are combined and compared in a well known interferometer. The resulting output is indicative of the magnitude and direction of the pressure detected at each sensor. Thus with the sensors mounted in a substantially vertical circular array within each support, the orientation of each sensor with respect to the fluid surface may be detected.

BRIEF DESCRIPTION OF THE DRAWINGS

A better understanding of the benefits and advantages of my invention may be obtained from the appended detailed description and the drawings, wherein:

FIG. 1 shows a ship towing a streamer through a body of water;

FIG. 2 is a longitudinal cross section of the streamer at a typical sensor station;

FIG. 3 is a cross section of the streamer along line 3—3 of FIG. 2; and

FIG. 4 is a schematic of the optical circuitry.

FIGS. 5A and 5B illustrate light pulse behavior at the ends of a sensor.

DETAILED DESCRIPTION OF THE PREFERRED EMBODIMENT

In the various views of this invention, similar reference characters indicate like components.

In FIG. 1, a ship 10 is towing a streamer 12 through a body of water 14. Streamer 12 is coupled to the ship 10 via a lead-in cable 16. Connected to the distal end of streamer 12 is a tail buoy or drogue 18 to provide a surface marker as to the location of the streamer end.

Streamer 12 houses many sets 20 of sensors, several stress members such as 22, and at least one signal-transmission bundle 24. The transmission bundle 24, extends through streamer 12 and lead-in cable 16 and interconnects each sensor set 20 to a data processing package 26 aboard the ship 10. The processing package 26 may be any suitable interferometer type, such as the one described in U.S. Pat. No. 4,547,869 assigned to the assignee of this invention.

FIG. 2 is an enlarged longitudinal cross-section of a portion of the streamer 12, while FIG. 3 is a transverse cross-section along line 3—3 in FIG. 2. As shown in the Figures, a sensor set 20 is concentrically disposed within a streamer skin 28. The streamer skin 28 is approximately three inches in diameter and is usually made of polyvinyl chloride, polyurethane, or like material. Each sensor set 20 consists essentially of a cylindrical support 30 having an axial hole 32 extending therethrough for receiving the transmission bundle 24, and several off-axial holes, such as 34, for extending the stress members 22 therethrough. At least three channels such as 36, run longitudinally along the periphery of each support 30. For example, but not by way of limitation, the dimensions of each channel 36 may be approximately one-eighth inch deep and one-quarter inch wide. The ends of each channel are open to equalize pressure. The dimensions of each channel are grossly exaggerated in the Figures for reasons of visual clarity. Each channel 36 is in communication with the axial hole 32 by a passage such as 38, radiating outwards from the axis of the support 30.

Each passage 38 contains two optic fibers such as 40, 42, and 44, 46. The ends of the optic fibers are directionally coupled to each other by a well known 3 dB coupler generally indicated as 48. Coupler 48 is tightly fixed within passage 38. A flange near the top, positions each coupler 48 within passage 38 so that the end of one fiber is substantially perpendicular to and at a preselected distance from an imaginary line above each channel defining the outer circumference of the support 30. For example but not by way of limitation, the distance may be one-hundreth of an inch. Coupler 48 may be removed from passage 38 for repairs or maintenance to the optic fiber ends. The opposite end of each fiber optic strand is connected to the processing package 26 by the transmission bundle 24.

Tightly surrounding and concentric with support 30 is a diaphragm member 50. The inner circumference of diaphragm 50 has a reflective surface 52. Diaphragm 50 may be made of foil or other type of resilient material. One channel 36, plus the coupled fiber optic strands 40 and 42, and the portion of reflector 50 above each channel 36, constitutes a single fiber-optic displacement sensor generally indicated as 54. The principle of operation of sensor 54 is disclosed in U.S. patent application Ser. No. 565,091, now U.S. Pat. No. 4,572,949 assigned to the Leland Stanford University. For example but not by limitation, FIG. 3 illustrates a sensor set 20 consisting of four such fiber-optic displacement sensors 54 arranged at ninety degrees to each other in a circular array. Each sensor set 20 may be arranged within the streamer skin 28 so that each displacement sensor 54 would be aligned along one of four common radials with respect to the streamer skin. Sensors 54 oriented along similar radials would be coupled to common input and output lines within the transmission bundle 24.

For simplicity, the following description of the best mode of operation will be restricted to the two sensors 54 and the associated circuitry initially shown in FIG. 2. It is to be understood that additional sensors 54 and sets 20 function in a similar fashion.

The preferred method of operation may be gleaned from FIGS. 4, 5A, and 5B which schematically illustrate the optical circuitry. FIG. 4 is an embodiment of the optical circuitry of this invention. The dashed line 25 represents the boundary between the processing package 26 on the left, aboard the ship 10, and the streamer contents on the right. Although only one sensor set 20 is illustrated, it is to be understood that many sets 20 may be deployed along the length of the streamer 12.

Initially, a light source 60 such as a laser directs a coherent monochromatic light pulse 62 towards the fibers comprising the transmission bundle 24. The light pulse 62 enters each optic fiber within transmission bundle 24 equally and is distributed to fiber pairs such as 40, 42 and 44, 46 within each sensor 54. One of the two fibers in each sensor 54 may be longer than the other. For sake of example consider that fibers 42 and 46 are the longer in each set shown. Shown in FIGS. 4 and 5A, the portion of light pulse 62 propagating in the longer fiber is designated as 62'. The pulses 62, 62' traveling through the fibers are combined at coupler 48. The portion of light pulses 62, 62' propagating towards the sensor ends of fibers 42, 46 are absorbed by filter 49 at the ends of the longer fibers. The remaining portion of the coupled light is directed upon the reflector 52 through fibers 40, 44, although at different times because of the different fiber length each pulse must follow. The light pulses 62, 62' incident upon the reflector 52 do not interfere with each other because of the time delay. Each pulse 62, 62' is reflected from reflector 52 and re-enters the fibers 40, 44. A portion of each reflected light pulse 62, 62', is redirected by coupler 48 so as to enter each fiber 40, 42 and 44, 46. Each fiber 40, 42 and 44, 46 then has two light pulses 62, 62' counter-propagating therein as shown in FIG. 5B. It is important that each optic-fiber end 40, 44 be close to the reflective surface 52 of diaphragm 50. If the distance between each optic-fiber end 40, 44 and the inner surface 52 of the diaphragm 50 is too great, the light pulse launched from each fiber would be dispersed and lost.

If diaphragm 50 is vibrating because of an incident acoustic wave, or is displaced because of a static pressure change, the directed light pulses from each fiber will travel different-length paths from the fiber end to the reflector 52. The difference in the length of the two travel paths will cause a phase shift in one reflected light pulse relative to the other. The light pulses 62, 62' counter-propagating in the opposite fibers will travel substantially the same optic fiber path lengths except for the difference in length between the fiber end and the undulating reflector 52. The reflected pulses that have traveled substantially the same geometric length of fiber, arrive at the processing package 26 correlatable with respect to one another. The light pulses from each fiber in a sensor 54 are combined and passed to a light detector within processing package 26 where the phase shift between the light pulses is determined. The amount of phase shift is proportional to the displacement of the diaphragm 50.

As mentioned above, each sensor 54 will provide a signal indicative of the hydrostatic and transient pressures incident upon the diaphragm 50. The relative vertical position of each sensor 54 within a set 20 is determined by measuring the relative hydrostatic pressures between sensors 54. The sensors 54 within each set 20 experiencing greater hydrostatic pressures will return a signal more out-of-phase than the others within the same set. Thus at any one point in time, the orientation of the streamer within the fluid can be measured. As an upward propagating transient wave passes the substantially horizontal streamer 12, the lower portion of the streamer skin 28 first receiving the wave will move inward slightly, decreasing the distance between the lower diaphragm 50 and fiber 44. As the acoustic wave passes through the streamer 12, the distance between the fiber 40 and the upper diaphragm 50 will increase. As the diaphragm 50 is modulated above each sensor 54 by the passing acoustic wave, the reflected light pulses counter-propagating through each of the fibers are phase modulated in a manner descriptive of the direction and magnitude of each acoustic wave.

In the preferred embodiment, sensors 54 are positioned at substantially equal angles from each other around the support 30. However, in one embodiment of this invention, the angles between the sensors 54 may be unequal. In the latter case, the sensors 54 must be oriented such that at least one sensor receives a signal delayed in time from the others.

In another embodiment of this invention, each optic fiber within a sensor 54 may run the length of signal transmission bundle 24 and connect to the processing package 26.

In another embodiment of this invention, each sensor may be coupled to a separate light source and detector within a module in the streamer 12. The signals could then be converted to analog electrical signals and returned to the processing package 26 by wire conductors.

In yet another embodiment of this invention, the reflective diaphragm 50 may be substituted by a reflective coating applied to the inner surface of the streamer skin 28.

In still another embodiment of this invention, the light source 60 may launch a continuous wave light beam into the transmission bundle. More than one sensor set 20 may be deployed within a streamer as illustrated in FIG. 1. The signals from each set may be time-division-multiplexed, as is well known in the art enroute to the processing package 26.

For illustrative purposes, my invention has been described with a certain degree of specificity. Variations will occur to those skilled in the art but which may be included within the scope and spirit of this invention which is limited only by the appended claims.

I claim as my invention:

1. An apparatus for determining a direction adn magnitude of an acoustic signal propagating through a fluid, said apparatus comprising in combination:
   (a) a cylindrical diaphragm, which is deformable by acoustic signals, having an optically reflective inner circumference;
   (b) a plurality of optical fibers radially disposed within said deaphragm in substantially the same plane, each of said optical fibers having an end oriented substantially perpendicular to said reflective inner circumference so as to direct and receive a coherent light pulse incident upon said diaphragm whereby deformation of said diaphragm by said acoustic signal phase shifts the received light pulse at said optical fibers by an amount proportional to a change in distance between said optical fibers and the inner circumference of said diaphragm;
   (c) transmitting means connecting each of said optical fibers to a remote signal processing system; and
   (d) emitting means connected to said remote signal processing system for lauching the coherent light pulse into each of said optical fibers through said transmitting means.

2. An apparatus as defined in claim 1 wherein said optical fibers are radially disposed within said diaphragm by a cylindrical supporting means.

3. An apparatus as defined in claim 2 wherein said supporting means, comprises:
   a sensor support of generally cylindrical form having an axial hole and a plurality of off-axial holes extending therethrough, at least three longitudinal channels parallel to said axial hole embedded along the outer surface of said support, and each in fluid communication with said axial hole by a passage radiating outwards perpendicularly therefrom.

4. An apparatus as defined in claim 1 wherein said transmitting means comprises a plurality of single-mode fiber optic strands.

5. A pressure-gradient sensor for use in a body of fluid, comprising:
   (a) a fluid-filled housing:
   (b) a pressure sensitive diaphragm having an optically reflective inner circumference, conforming to the inner surface of said housing;
   (c) at least one sensor set concentrically disposed within said diaphragm, said set having at least three fiber-optic waveguides radially arranged at preselected locations within substantially the same plane, each of said waveguides oriented so as to direct and receive a coherent light pulse incident upon said diaphragm whereby a change in distance between said waveguide and said diaphragm phase shifts the received light pulse by an amount proportional to the distance change;
   (d) a transmission bundle connecting each of said waveguides to a remote recording system; and
   (e) a light source connected to said recording system for launching the coherent light pulse into said transmission bundle.

* * * * *